United States Patent [19]

Yasumoto et al.

[11] Patent Number: 5,800,888
[45] Date of Patent: Sep. 1, 1998

[54] HEAT BONDED TYPE VIBRATION-DAMPING RESIN FOR STRUCTURAL MEMBER VIBRATION-DAMPING STRUCTURE

[75] Inventors: Toshiaki Yasumoto, Tokyo; Hiromichi Okumura, Osaka; Kenji Iwai, Tokyo; Toshimitsu Tanaka, Kobe; Toshihiko Sasaki, Shimonoseki; Akio Sugimoto, Kobe; Hiroshi Kawashima, Tokyo; Naofumi Itano, Tokyo; Manabu Shibata, Tokyo; Yasuo Nanri, Tokyo, all of Japan

[73] Assignees: Kabushiki Kaisha Kobe Seiko Sho, Kobe; Nihon Tokushu Toryo Co., Ltd., Tokyo, both of Japan

[21] Appl. No.: 598,214

[22] Filed: Feb. 7, 1996

[30]  Foreign Application Priority Data

Feb. 8, 1995 [JP] Japan .................... 7-044937
Jun. 9, 1995 [JP] Japan .................... 7-168371

[51] Int. Cl.$^6$ .................... B29D 22/00; B32B 15/04; B32B 15/06; E04B 1/82
[52] U.S. Cl. .................... 428/36.91; 428/457; 428/468; 428/465; 428/469; 181/210; 181/284; 181/290
[58] Field of Search .................... 428/457, 458, 428/465, 468, 489, 36.91, 469; 181/210, 256, 284, 290, 294

[56] References Cited

U.S. PATENT DOCUMENTS

| | | | |
|---|---|---|---|
| 4,204,022 | 5/1980 | Snyder et al. | 428/337 |
| 4,412,864 | 11/1983 | Kurashige et al. | 106/235 |
| 4,559,252 | 12/1985 | Motoda et al. | 428/57 |
| 4,734,323 | 3/1988 | Sato et al. | 428/317.3 |
| 5,192,420 | 3/1993 | Ohta et al. | 208/23 |
| 5,350,610 | 9/1994 | Mashita et al. | 428/35.7 |
| 5,435,842 | 7/1995 | Mukarida et al. | 106/672 |

FOREIGN PATENT DOCUMENTS 50-14783  2/1975  Japan.
5-24150  2/1993  Japan.

OTHER PUBLICATIONS

Database WPI, Derwent Publications, AN 89-057560, JP-A-01 009 732, Jan. 13, 1989.
Database WPI, Derwent Publications, AN 70-20907R, SU-A-245 950 (no month, no year).
Patent Abstracts of Japan, vol. 10, No. 245 (C-368), Aug. 22, 1986, JP-A-61 076539, Apr. 19, 1986.

*Primary Examiner*—John J. Zimmerman
*Assistant Examiner*—Michael LaVilla
*Attorney, Agent, or Firm*—Oblon, Spivak, McClelland, Maier & Neustadt, P.C.

[57] ABSTRACT

The present invention relates to a heat-bonded type vibration-damping resin for a structural member which contains in view of a preferable blending rate asphalt, synthetic rubber, petroleum resin and filler material, and further a heat-bonded type vibration-damping resin for a structural member which contains in view of a preferable blending rate asphalt, filler material, blowing agent. In addition, its basic concept consists in a configuration in which the vibration-damping resin is formed into a sheet and arranged at the surface of the metallic structure used at a place where vibration and noise should be prevented so as to form the vibration-damping structure and a method for manufacturing the vibration-damping structure. The vibration-damping resin can be easily mounted on the surface of the metallic structure having an elongated shape, bonded to it by heating and has a workability in which the mounting work to the metallic plate may be facilitated. In addition, thermoplastic resin and the like can be arranged between the metallic plate and the vibration-damping resin.

8 Claims, 7 Drawing Sheets

F I G. 1
F I G. 2
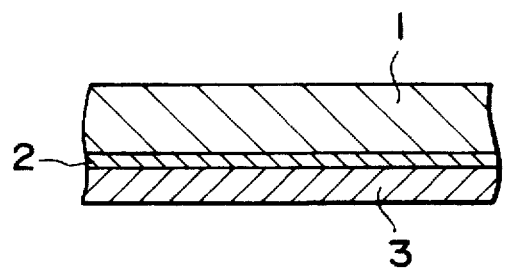
F I G. 3
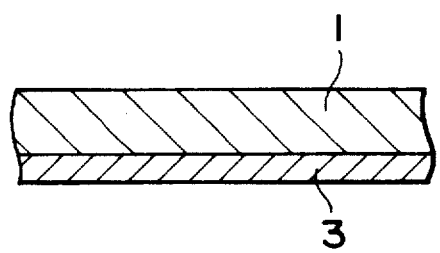

HEAT BONDED TYPE VIBRATION-DAMPING RESIN FOR STRUCTURAL MEMBER VIBRATION-DAMPING STRUCTURE

BACKGROUND OF THE INVENTION

1. Technical Field of the Invention

This invention relates to a vibration-damping resin for a structural member to be used in a structure in a vehicle or a ship or a floor or an outer wall of a building structure, a vibration-damping structure having the vibrating-damping resin coated at the surface of a metallic plate or the like and a method for manufacturing the vibration-damping structure.

2. Description of the Related Art

As a metallic material for a structure of a vehicle or a ship or some building structures and their outer walls, material such as iron or aluminum or the like is used in general as the structural member. Although these materials have some advantages that they have a high heat-resistant characteristic or a high mechanical strength or a high modulus of elasticity, they have a problem of producing a sound resonance or vibration which is specific to metal and concurrently a poor thermal insulating performance as compared with other material such as wooden material and the like. In view of this fact, in order to solve these disadvantages, the following matters have been studied.

At first, as material for applying a vibration-damping performance to the metallic plate, the restraint-type vibration-damping steel plate has been developed. This plate has been constructed such that a thin resin having a viscosity is held between two steel plates so as to form a sandwich structure. In addition, as the non-restraint-type vibration-damping steel plate, there is provided either a plate having a thick resilient resin sheet adhered to one surface of one steel plate or a plate in which a heat melting and adhering sheet having asphalt substance as its major substance is formed with heat by about 1.2 to 2 times as its initial volume and concurrently the plate is thermally adhered to the metallic plate (refer to a gazette of Japanese patent publication No. Sho 63-65212) and the like. However, in the case that such a restraint-type vibration-damping steel plate is used, it shows a problem that it may not be applicable to an extruded shape having a complex figure, and in the case that the vibration-damping resin is adhered to the surface material of the structure such as a non restraint-type vibrating-damping steel plate, it may not be adapted for the complex concave or convex shapes of the surface material of the structure and concurrently it shows a problem that there is a certain restriction in production such as one requiring an adhering work of the vibration-damping resin at the later stage of operation. In particular, these problems are remarkable in the case that they are applied to a long shape such as an extruded shape member having a width of 1 m or less and a length of 5 m or more, for example.

In the gazette of Japanese patent Laid-Open No. Hei 5-329973 is disclosed a method for manufacturing a vibration-damping structure in which vinyl chloride resin is adhered as a spacer layer for the vibration-damping structure and a composite comprised of vinyl chloride resin, plasticizer, epoxy resin and blowing agent is adhered to a shaped-member as the vibration-damping resin. The method using such a blowing agent as described above has an advantage that the complex concave or convex shapes of the base material (the surface material of the structure) are accommodated by foaming so as to enable an adhering characteristic to be increased, although it has a disadvantage that epoxy resin having the spacer layer foamed and hard set shows that resin itself is hard and fragile. Due to this fact, as a small amount of epoxy resin is applied to cause the resin to be softened, there occurs a possibility that the resin is easily agglomerated and fractured between it and the base material, resulting in that the poor adhering characteristic is provided.

In the prior art system, in the case that the base material is provided with the foaming layer and that the flexibility, the modulus of elasticity and elongation or the like of the resin under its melting state are improper, some concave or convex portions are generated at the surface due to its non-uniform foaming, and in particular, a foaming layer of uniform thickness having a foaming multiplication rate exceeding 3 times could not be obtained, although the foamed layer having a uniform thickness can be formed under an arrangement of the restraint layer on the foaming layer as disclosed in the aforesaid gazzette, even if the foaming rate is high. However, if the aluminum plate is arranged on the foaming layer as the restraint layer, for example, it is necessary to form the layer into a complex figure or a curved surface profile along with the base material and there is a problem in which such a formation as above is substantially difficult.

In a gazette of Japanese patent Laid-Open No. Sho 59-124843 is disclosed a technology in which the vibration-damping material of thermo-setting resin containing a flaky inorganic material is covered by a thermal insulating layer having a high-molecular foamed structure. The method such as this has the following problem. That is, although as the resin composite material, thermo-setting resin such as unsaturated polyester resin or epoxy resin or the like is used, a feature in which the flaky inorganic materials are built up in the same direction is an important requirement for realizing the vibration-damping characteristic, and another feature in which the resin is of liquid substance of its viscosity being low is an essential requirement. In order to satisfy these conditions and make a satisfactory result, it is necessary to coat the resin with a spray and the like, resulting in that it becomes difficult to make a uniform coating within narrow spaces of a long extruded shape or at the surfaces of the complex shape as disclosed in the present invention.

In the gazette of Japanese patent Laid-Open No. Sho 59-212249 is disclosed the method for making the vibration-damping structure in which thermoplastic resin and the glass fiber fabric are buried in it. Although the glass fiber fabric is applied in order to prevent the foamed layer from being crushed at a high temperature, it shows a problem that some air bubbles are accumulated between the resin layer and the glass fiber fabric to cause both layers to be separated from each other. In addition, the method in which the thermoplastic resin and the glass fiber fabric are buried to make a vibration-damping structure shows a problem that a poor vibration-damping performance is attained due to a low modulus of elasticity of resin itself.

In turn, in the application to which the present invention is applied, it is often known that an indoor temperature and a temperature of surrounding atmosphere are different from each other and it is important that a thermal insulating characteristic is provided in addition to the vibration-damping characteristic in order to assure a comfortable dwelling state in an indoor area and so it is desired to provide the structure having these two performances. As such a technology as described above, it is generally performed to adhere a thermal insulating material to either a vibration-damping steel plate or a vibration-damping structure having a vibration-damping performance.

However, the method in which the thermal insulating material as described above is adhered later shows some problems that another adhering work after assembling the structure is required and an adhering work for adhering the vibration-damping structure cannot be performed after adhering of the thermal insulating material (even if the vibration-damping material is adhered after adhering of the thermal insulating material, performance of the vibration-damping resin cannot be realized). It also has a problem that this method cannot be applied to such a shape as one in which a spacing for the insertion of the thermal insulating material cannot be attained (in the case of a hollow and long structure, for example, it is difficult to insert the thermal insulating material later).

Although some methods for solving these problems have already been proposed for fulfilling these requirements above, it is a present situation that they are not sufficiently applied yet.

For example, in the gazette of Japanese patent Laid-Open No. Hei 5-24150 is disclosed a heat-resistant vibration-damping member comprised of a layer having specific butadiene compound and filler material added to asphalt substance and a hot-melt adhering layer with a specified hardness. Although its specification discloses the fact that blowing agent is added, in the case of the present compound, it is hard to generate a uniform foaming due to a high viscosity even if the compound is melted at its heating stage. In addition, in view of an elongation or viscosity or the like of compounding materials, the value of a foaming multiplication rate, i.e. a volume after foaming in respect to an original one is limited to about 150 % and a sufficient thermal insulating characteristic may not be attained.

In a gazette of Japanese patent Laid-Open No. Sho 50-14783 is disclosed a thermal insulating vibration-damping material in which the first layer comprised of asphalt substance and synthetic resin or the like is applied as an adhering layer, and the second layer is comprised of a synthetic rubber layer having synthetic rubber and blowing agent or the like, heated, foamed and vulcanized. In the case of this thermal insulated vibration-damping material, although it is necessary that vulcanization and foaming are carried out concurrently at the stage of heating operation, there remain some problems that the vulcanization at the foamed part is insufficient, a uniform foaming control is limited to a foaming of about 1.2 to 3 times and a uniform foaming control over 3 times or more is difficult to perform in view of blending of resin, and a bulging of an air layer embedded in an interface part may become a cause of peeling-off of two layers due to a separate forming of sheets of these two layers.

The present invention has been completed in order to solve the aforesaid problems of the prior art and it is an object of the present invention to provide a heating, melting and adhering vibration-damping resin for a structural member, a vibration-damping structure and its manufacturing method in which the vibration-damping structure having both superior vibration-damping and thermal insulating performances and also having both sufficient mechanical features and workability in such a manner that the metallic structure having a complex shape or a long-shape can easily be worked can be formed.

SUMMARY OF THE INVENTION

The present invention consists in the heat-bonded type vibration-damping resin for a structural member containing asphalt, synthetic rubber, petroleum resin and filler materials under a preferable blending rate for realizing various features such as vibration-damping and the like, and additionally, the heat-bonded type vibration-damping resin for a structural member containing asphalt, filler materials and blowing agent under a preferable blending rate for improving a thermal insulating characteristic in particular, and as its basic features, the present invention has a configuration in which the vibration-damping resin is worked into a sheet form and arranged at the surface of a metallic structure used at a part where vibration and noise must be prevented and a method for manufacturing the vibration-damping structure.

Since the aforesaid vibration-damping resin has a high vibration-damping characteristic as well as a high thermal insulating characteristic and also has a superior mechanical strength (in particular, a tensile strength and a flexibility), the elongated vibration-damping resin of which production was difficult in the prior art vibration-damping resin can be easily produced, it may easily be installed for the elongated metallic structure, and it has a workability in which it can be connected by heating operation and an installing and connecting work for a metallic plate can be easily performed. In addition, the thermoplastic resin and the like are arranged between the metallic plate and the aforesaid vibration-damping resin to cause these characteristics to be improved more and concurrently a superior resistant characteristic against impact at low temperature can be improved.

Such a vibration-damping resin as described above is heat-bonded to the surface of a metallic structure such as a metallic plate and the like to form a vibration-damping structure, thereby a vibration energy applied to the metallic structure is converted into a heat energy so as to make a substantial reduction in vibration and acoustic energy. This material is applied to structural members such as a floor plate, a side wall and a ceiling of a high-speed railway vehicle, for example, used at a part where vibration and noise should be prevented, thereby noise within a compartment room can be substantially reduced.

In particular, since the method for manufacturing such a vibration-damping structure as above may provide a vibration-damping resin sheet having a superior mechanical strength (in particular, a tensile strength and a softness) as described above, working of the elongated vibration-damping resin may easily be performed, and for example, for the insertion of resin into an inner surface of a hollow section of a extruded shape, the resin is worked into a sheet-like form and directly inserted into it while being pulled into it, resulting in that the resin can be mounted on the inner surface. In this method, thermoplastic resin is placed between the vibration-damping resin and the surface of a metallic plate to enable its working characteristic to be more improved.

BRIEF DESCRIPTION OF THE DRAWINGS

FIG. 1 is a front elevational view for showing a substantial part in which a vibration-damping resin is heat-bonded to a metallic structure.

FIG. 2 is a front elevational view for showing a substantial part of a vibration-damping resin to which a thermoplastic resin film is adhered through a hot-melt adhesive agent.

FIG. 3 is a front elevational view for showing a substantial part of a vibration-damping resin to which a thermoplastic resin film is adhered.

DETAILED DESCRIPTION OF PREFERRED EMBODIMENTS

Figure 4:
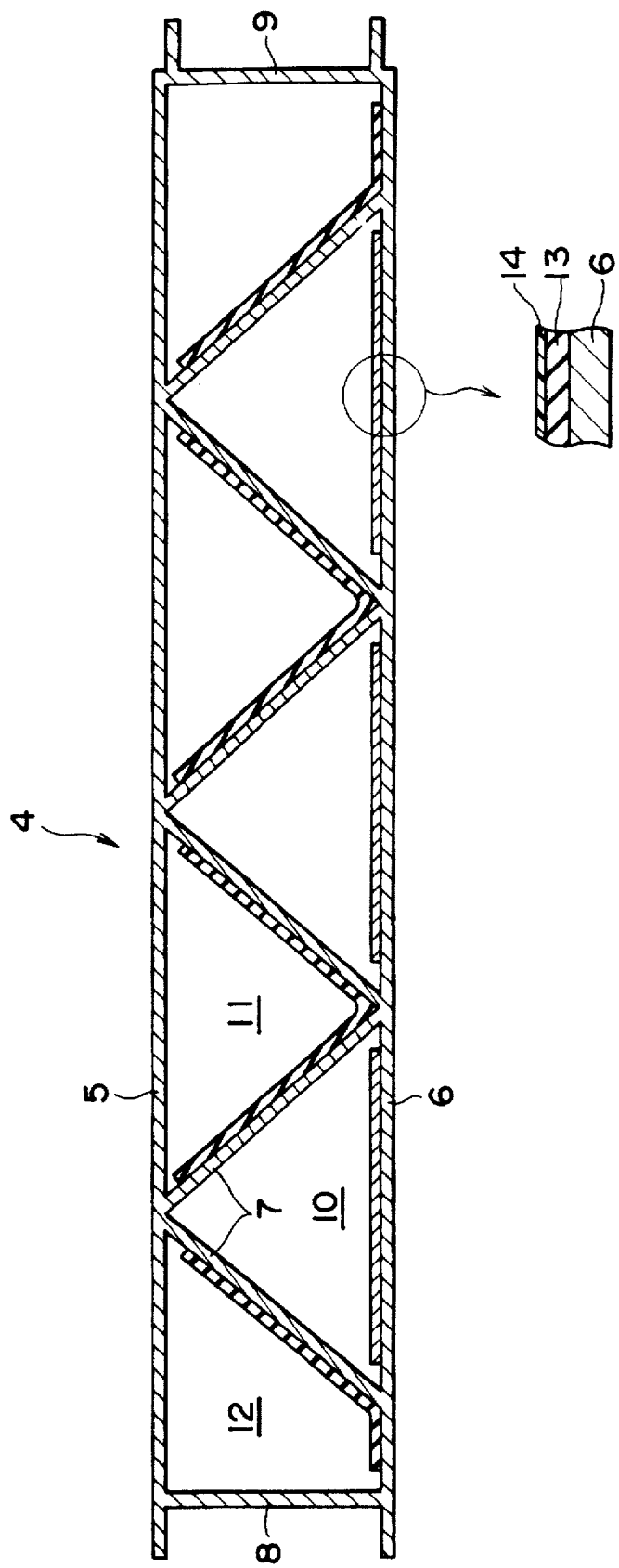
FIG. 4 is a sectional view for showing a truss-type vibration-damping hollow section of a preferred embodiment of the vibration-damping structure of the present invention to which the vibration-damping resin is thermally melted and adhered (heat-bonded).

At first, objects of each of compounds contained in the heat-bonded type resin for a structural member (hereinafter called as vibration-damping resin) will be described as follows.

A reason why asphalt is contained in it consists in applying a resiliency and a tensile strength to the vibration-damping resin. In addition, a reason why synthetic rubber is contained consists in getting of an improved resiliency and a requisite vibration-damping performance. A reason why petroleum resin is contained consists in a realization of adhering characteristic at the vibration-damping resin. A reason why filler materials are contained consists in holding a shape of vibration-damping resin and realization of thermal insulating characteristic. The vibration-damping resin composed of such compounds as described above has a self-bonding characteristic in which the resin is melted during its heating, flowed into complex concave or convex shapes of the metallic structure and closely contacted with the metallic structure, thereby a sufficient vibration-damping performance can be applied to the metallic structure, a presence of high flexibility causes a taking-up characteristic with a roll during production of the vibration-damping resin to be improved and concurrently its tensile strength is also improved to realize a superior workability for the insertion of the resin sheets to the elongated shapes.

The most preferable amount of ingredients of vibration-damping resin will be described as follows.

It is preferable that a volume of asphalt is about 15 to 35 wt %. A volume of 15 wt % or lower may cause a modulus of elasticity of the vibration-damping resin to be insufficient, a vibration-damping performance may not be attained and concurrently it shows some disadvantages that if asphalt in solid state at a room temperature is melted during heating operation and used, its handling characteristic is damaged and heat-resistant feature is also reduced. In addition, if the volume exceeds 35 wt %, a tensile strength is decreased and its workability is deteriorated. As materials which can be applied as asphalt, natural asphalt and petroleum asphalt are present. As petroleum asphalt, there are straight asphalt, blown asphalt, semi-blown asphalt and modified asphalt with rubber (rubberized asphalt) or the like. These asphalts can be used in a single form and additionally several kinds of asphalts can be mixed and used.

As to synthetic rubber, it is preferable that its weight range is 2 to 10 wt %. If it is lower than 2 wt %, a sufficient resiliency cannot be applied to the vibration-damping resin and a required vibration-damping performance may not be attained. In turn, if the weight exceeds 10 wt %, a tensile strength of the vibration-damping resin is reduced and its workability is deteriorated.

As materials which can be used as synthetic rubber, there may be applied butyl rubber, styrene rubber, chloroprene rubber, styrene-butadiene rubber and the like. In particular, although it is preferable to use styrene-butadiene rubber, it may also be applicable to use the mixture of various kinds of rubber. In addition, if required, as rubber-like substance, it may also be applicable to have polybutadiene type plastic elastomer containing 1, 2 bond of 90 wt % or more or liquid-like rubber, stylene rubber and acrylic rubber or the like having carboxyl group or amino group chemically modified at their terminal groups.

As to petroleum resin, it is preferable to have 1 to 5 wt % as its weight. If the value is 1 wt % or lower, a tensile strength of the vibration-damping resin is low, the vibration-damping resin may be broken during setting work of the vibration-damping resin to the shaped member and in turn if the weight exceeds 5 wt %, its flexibility is reduced to cause the setting workability of the resin to the shape to be deteriorated and concurrently its resiliency is also reduced, so that there is a possibility that a sufficient vibration-damping performance may not be attained.

It is preferable that the weight of the filler materials is in a range of 50 to 75 wt %. If the weight is 50 wt % or lower, there may occur some disadvantages that it becomes difficult to hold its shape during heating, melting and bonding operation and in turn if the weight exceeds 75 wt %, the vibration-damping resin itself may increase its own weight, resulting in that it may influence against various performances in a vehicle of which light weight is required and at the same time a thermal insulating characteristic may not be sufficiently applied.

In addition, as blending substances of the filler material and its blending rate, it is preferable to apply the following configuration. That is, inorganic light weight aggregate is 10 to 25 wt %, powder-like filler material is 35 to 50 wt %, fibrous filler material is 3 to 8 wt % and lime stone is 2 to 5 wt %. With such a configuration of the filler material as described above, its specific weight can be kept low to enable by itself to contribute to a light weight of the vibration-damping resin and at the same time a superior thermal insulating characteristic can be realized. A reason why the inorganic light weight filler is set to be 10 to 25 wt % consists in the fact that if the value is 10 wt % or lower, its light weight characteristic may not be sufficiently realized and in turn if the value exceeds 25 wt %, its vibration-damping characteristic is reduced. A reason why the weight of the powder-like filler material is set to be 35 to 50 wt % consists in the fact that if the weight is 35 wt % or lower, the shape may not be held when the vibration-damping resin is worked into a sheet form, its workability may be damaged and in turn if the weight exceeds 50 wt %, its light weight setting may become insufficient. A reason why the weight of fibrous filler material is set to be 3 to 8 wt % consists in the fact that if the weight is 3 wt % or lower, a tensile strength of the vibration-damping resin itself is reduced to cause its workability to be deteriorated and in turn if the weight exceeds 8 wt %, its vibration-damping characteristic is reduced. A reason why a weight of the lime stone is set to be 2 to 5 wt % consists in the fact that if the weight is 2 wt % or lower, there is a possibility that a bulging may occur when the vibration-damping resin is heat-bonded, and if the weight exceeds 5 wt %, its effect may not be changed and this becomes a disadvantage in view of its cost.

As the filler materials which can be used, there may be applied powder-like filler material, fibrous filler material, flaky filler material, light weight filler and the like. As the powder filler material, there may be applied barium sulfate, calcium carbonate, zinc dust, zinc white and clay or the like. As the fibrous filler material, there may be applied the fibers released from natural fiber and chemical fiber, paper fiber obtained from crushed used paper, glass wool and mineral substance fiber obtained from glass wool and the like. As the flaky filler material, there may be applied mica and the like. As the light weight filler, there may be applied inorganic light weight filler having, as their raw materials, ores such as silica type light weight filler, sand bar type light weight filler or the like and organic light weight filler such as copolymers of methyl acrylate, ethyl acrylate, methyl methacrylate, acrylonitrile and the like or acrylic plastic baloon in copolymerization with vinyl acetate and vinyl chloride stylene and the like.

In turn, it is also possible to cause a proper amount of blowing agent to be included in the vibration-damping resin composed of only asphalt and filler agent in order to have a remarkable increased vibration-damping characteristic and thermal insulating characteristic while flexibility and tensile strength obtained by the vibration-damping resin composed of asphalt, filler agent, petroleum resin and synthetic rubber are being kept.

A blending rate of each of the ingredients is set such that asphalt is 70 to 150 weight part, filler agent is 15 to 300 weight part, and blowing agent is 0.5 to 10 weight part, wherein the vibration-damping resin is manufactured under this rate. In view of the operation in which a foaming multiplication is controlled, it is further preferable that asphalt is 70 to 100 weight part, filler material is 100 to 300 weight part and blowing agent is 0.5 to 5 weight part, respectively.

In this case, a reason why asphalt is 70 to 150 weight part consists in the fact that if the weight is 70 weight part or lower, a resiliency of the vibration-damping resin is not sufficient, and a desired vibration-damping characteristic cannot be attained. In addition, although it is necessary that the vibration-damping resin is melted when the resin in its solid state at room temperature is heated in view of its handling characteristic, if the amount of asphalt is less, it shows some disadvantages that the resin may not be melted and moreover, its heat-resistance is reduced. In turn, if the weight exceeds 150 weight part, a specific weight of the vibration-damping resin is increased and it becomes difficult to get a sufficient high foaming rate when the resin is heated and melted. As asphalt which can be used, it may be similar to that of the aforesaid various kinds of asphalt. Either a single asphalt or its combination can be applied for blending operation.

As to the filler agent, if the weight is 15 weight part or lower, it may generate a disadvantage that holding of shape of the resin when the resin is heated and melted becomes difficult and in turn if the weight exceeds 300 weight part, the weight is increased by more than a required value and it becomes a trouble for the foaming operation. As to the filler material which can be used, it may be similar to that of the aforesaid various kinds of filler material.

If the weight of the blowing agent is 0.5 weight part or lower, its foaming multiplication cannot be sufficiently assured and in turn in the case that the weight exceeds 10 weight part and the resin is blended, there is a possibility that an excessive foaming multiplication may occur. The blowing agent with its decomposing temperature being 100 ° C. or lower is not preferable due to a possibility that the blowing agent is decomposed when the compound is dispersed and kneaded at the manufacturing stage of the vibration-damping resin. More practically, as the blowing agent, there may be applied diazoaminobensole, azoisobutylnitrile, benzolsulfohydrazide, azide carbamic acid, azodicarbonamide, p-p' oxibensolsulfohydrazide, azobisintironitrile, benzilmonohydrazol, dinitropentametylenetetramine and the like. These substances may be applied in single form or in mixture. In addition, it is also effective that urea and its derivatives are used as blowing assistant agent.

As a preferable foaming multiplication rate, it is satisfactory that a foaming of 3 to 7 times multiplication is carried out when bonding is performed with a metallic member acting as a substrate. Vibration-damping characteristic and thermal insulating characteristic can be remarkably improved by controlling the foaming multiplication within this range.

As to the method for manufacturing the vibration-damping resin containing the aforesaid compounds, a well-known method can be used.

Filler material is fed into asphalt melted by a proper heating means and agitated so as to be mixed and dispersed, resulting in that they may be manufactured. During mixing and dispersing operations, various kinds of mixers such as a vacuum kneader or open-kneader and a planetary mixer or the like and various kinds of dispersion machines such as a ball mill and the like can be used. Compounds of which mixing and dispersion are completed are formed into a sheet" like vibration-damping resin sheet 1 as shown in FIG. 1 by a rolling means such as two rolls, three rolls or a calendar roll or the like and cut into an optional shape and size. The vibration-damping resin can also be formed into a shape with three dimensions in compliance with a shape of the metallic structure to be heated and bonded. However, in the case that the resin is formed into a shape with three dimensions, a cold press is preferable due to the fact that the vibration-damping resin has a heat-sensitive characteristic.

In addition, as the type of metal of the metallic structure to which the vibration-damping resin is heat-bonded, metals widely used in the industry such as iron, aluminum, stainless steel, copper, titanium or these alloys can be used. Although it is preferable to get a state that oily substances or the like at the surface of the metal are removed, this is not an essential condition. The present invention can be applied to a metallic plate (a pre-coat metal) coated with proper synthetic resin coating material or a metallic plate having a surface treated with chemical substances or electrodeposition coating, for example.

In addition, there are provided the first layer comprised of the vibration-damping resin sheet 1 made of aforesaid compound and covering layers of one or more layer made of at least one kind of thermoplastic resin, thereby in the case that the shaped member has a narrow hollow space and the vibration-damping resin is adhered to the inner surface of the hollow space, for example, it is possible to increase a slipping characteristic of the vibration-damping resin and obtain a further improved workability of the insertion of the resin sheet to the hollow space. In addition, it is also possible to improve superior characteristics of the vibration-damping resin at low temperature (vibration-damping effect and shock resistance and the like), resulting in performing an easy manufacturing of the vibration-damping structure having a more superior performance.

As a practical example, as shown in FIG. 2, a hot melt adhesive agent 2 (the second layer) is applied to have a coating thickness of about 10 to 40 μm on the vibration-damping resin sheet 1 (the first layer) and a thermoplastic resin film 3 (the third layer) is piled up on the layer while the adhering power of the second layer is kept. The hot melt adhesive agent 2 is defined herein as is a solid adhesive agent in which its major substance is thermoplastic synthetic resin and as its reforming agents, waxes, plasticizer, adhesion applicator agent, anti-oxidation agent and filler agent or the like are properly blended to the major substance, this agent is heated up to such a temperature as one in which the agent can be applied as a coating by an exclusive applicator and coated. It is preferable that a film thickness of the hot melt adhesive agent 2 is about 10 to 40 μm. A reason for it consists in the fact that if this value is 10 μm or lower, a sufficient adhering capability cannot be attained, and in turn, if the value exceeds 40 μm, the adhering power is not changed even if the coating film thickness is more than the aforesaid value and to the contrary a vibration-damping performance is decreased. In addition, as the aforesaid thermoplastic resin film 3, there may be used a film made of polyester, polyethylene, polyurethane, vinyl-chloride, vinyl oxide or copolymers of these substances or the like. It is preferable that a film thickness is about 20 to 50 μm, and if the value is 20 μm or lower, a shock resistance at low temperatures is not sufficient and if the value exceeds 50 μm, the vibration-damping performance is reduced.

In addition to piling-up of and adhering of the aforesaid hot melt adhering agent 2 and the thermoplastic resin film 3, as shown in FIG. 3, only the thermoplastic resin film 3 may be mechanically adhered to the vibration-damping resin sheet 1 or the film may be heated up to such a temperature as one in which an adhering characteristic of the thermoplastic resin film 3 is applied and adhered to the vibration-damping resin 1. In addition, only the hot melt adhesive agent 2 may be mechanically adhered to the vibration-damping resin sheet 1. In addition, a plastic film may be piled up in place of the thermoplastic resin film and the like.

In the case that such coating layers are arranged between the surface of the shaped member to be adhered and the vibration-damping resin, the workability of insertion of the resin to shaped member by pulling action is improved and concurrently a superior characteristic at low temperatures of the vibration-damping resin (vibration-damping effect and shock resistance) is improved. In addition, even in the case that the surface of the shaped member and the vibration-damping resin are mounted in such a manner that they are contacted directly, and the coating layers are set on the vibration-damping resin, a superior characteristic (vibration-damping effect and shock resistance and the like) at low temperatures of the vibration-damping resin is improved.

Then, as one example of use of the preferred embodiments of the vibration-damping resin of the present invention, various vibration-damping structures having vibration-damping resin of the present invention adhered to the shaped member used in a floor member and a wall member of a vehicle requiring severe effects of vibration-proof and thermal insulation will be described.

FIG. 4 shows a sectional view for illustrating the vibration-damping structure of a truss-type aluminum extruded member of hollow profile. The elongated aluminum extruded member 4 is constructed to have a truss-type sectional shape in which upper and lower surface plates 5, 6 are supported by zig-zag slant ribs 7 and by vertical ribs 8, 9 at both ends, triangular hollow portions 10 and inverse-triangular hollow portions 11 as well as trapezoidal hollow portions 12 at both ends are formed. Vibration-damping resin 13 and polyethylene resin film 14 are adhered to the lower surface of the hollow portion 10, slant surface of the hollow portion 11, slant surface and lower surface of the hollow portion 12. In the example shown, the lower surface plate 6 is a sound source, and as found at the upper inner surface of the surface plate 6 and the upper inner surface of the slant rib 7, the vibration-damping resin 13 and the thermoplastic resin film 14 are mounted on the surfaces by their own weights. That is, at the hollow portion 10, flat resin sheets are mounted and valley-folded resin sheets are mounted against the hollow part 11, the vibration-damping resin 13 is melted and bonded through heating.

As a vibration is given from the sound source (lower side as viewed in the drawing) to such a vibration-damping structure 4 as above, the surface plate 6 is excited and a bending vibration is started. The vibration-damping resin 13 enclosed by the surface plate 6 and the thermoplastic resin film 14 is bent and deformed and a part of the vibration energy is converted into a heat energy. The residual vibration energy is transmitted to the ribs 7, and the ribs 7 may also start a bending vibration. The vibration-damping resin 13 enclosed by the ribs 7 and the thermoplastic resin film 14 is bent and deformed and a part of the vibration energy is converted into a heat energy. As a result, the bending vibrations of the surface plate 6 at the side of the sound source and the slant ribs 7 are restricted, the vibration energy of the entire truss structure is highly absorbed, and the vibration energy transmitted to the surface plate 5 positioned to the opposite side to the sound source (a silent environment side) is remarkably reduced.

Figure 5:
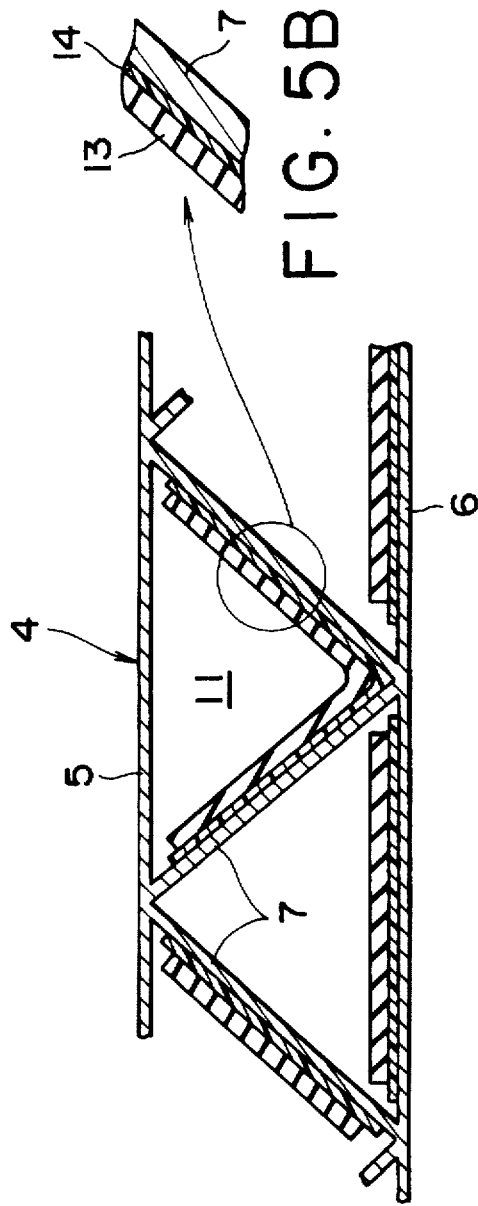
FIG. 5 is a partial sectional view for showing another preferred truss type vibration-damping hollow profile shown in FIG. 4.

FIG. 5 is a sectional view for showing another vibration-damping hollow profile. A part differing from that of FIG. 4 consists in an arrangement in which the vibration-damping resin 13 adhered to the inner surface of the hollow part 11 is adhered through the adhering layer 14 of the polyethylene resin film. That is, the outer surface of the vibration-damping resin 13 is not covered as shown in FIG. 4, and its outer surface is exposed to the air. Either aluminum foil or plastic film may be applied to the exposed resin surface in order to protect the resin layer against the surrounding atmosphere.

Figure 6:
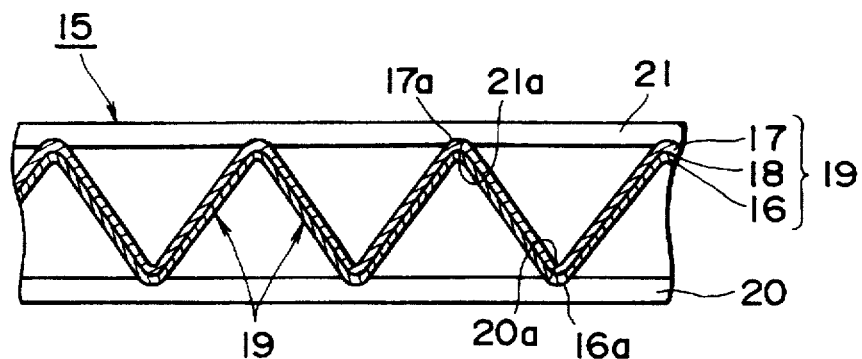
FIGS. 6 to 10 are partial sectional views for showing a still further preferred truss type vibration-damping hollow profile shown in FIG. 4.

In FIG. 6 is shown a still further form of the vibration-damping member. The vibration-damping member 15 is constructed such that the ribs of continuous bent plates forming the truss structure are formed as the vibration-damping ribs 19 integrally formed with the vibration-damping resin 18 being held between the aluminum plates 16, 17 and concurrently an aluminum plate 20 having longitudinal grooves 20a at one surface and an aluminum plate 21 having similarly the longitudinal groove 21a are arranged in such a way that these surfaces having the longitudinal grooves 20a, 21a may be oppositely faced to each other, a top part 17a of each of the mountains of the sandwiched vibration-damping plate 19 is fitted to the longitudinal groove 21a of the aluminum plate 21 and a valley 16a of each of the mountains is fitted to the longitudinal groove 20a of the aluminum plate 20 at the sound source side and adhered, respectively.

As vibration is given from the sound source (the lower side as viewed in the drawing) to the vibration-damping member 15, the face plate 20 is vibrated, the bending vibration is started and its energy is transmitted to the vibration-damping ribs 19, although at this time as the vibration-damping ribs 19 are bent and deformed, the resin 18 occupied at an intermediate layer of each of the ribs 19 is deformed in a shearing form, a part of the vibration energy is efficiently converted into heat energy. As a result, bending vibration of all the vibration-damping ribs 19 is restricted and the vibration energy transmitted to the aluminum plate 21 placed at the silent environment is highly reduced.

Figure 7:
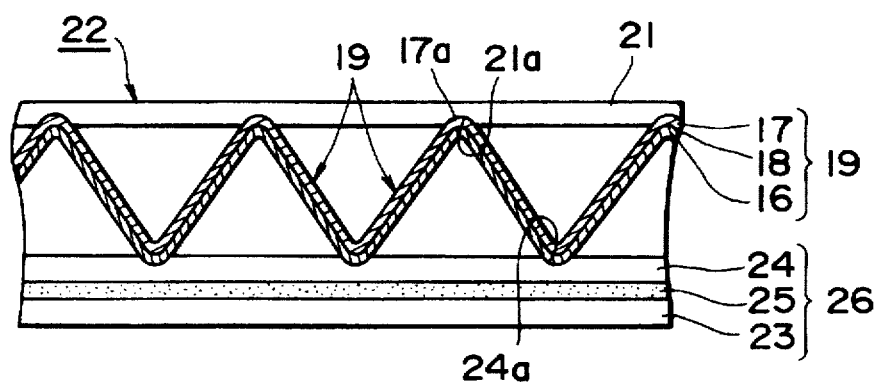

A vibration-damping member 22 shown in FIG. 7 is constructed such that a sandwiched vibration-damping plate 26 integrally formed with a vibration-damping resin 25 being held between the two aluminum plates 23, 24 in place of the aluminum plate 20 at the lower side of the vibration-damping member 15 in FIG. 6 is fixed. In addition, the upper side aluminum plate 21 can also be of a sandwiched vibration-damping plate. Accordingly, when the aluminum plate 26 at the sound source side is vibrated and starts a bending vibration at this vibration-damping member 22, the bending vibration energy is attenuated to a certain degree while passing through the vibration-damping resin 25, thereafter the energy is transmitted to the ribs 19, so that it is possible to improve a sound-shielding performance got through the vibration-damping resin 18 shown in FIG. 6.

Figure 8:
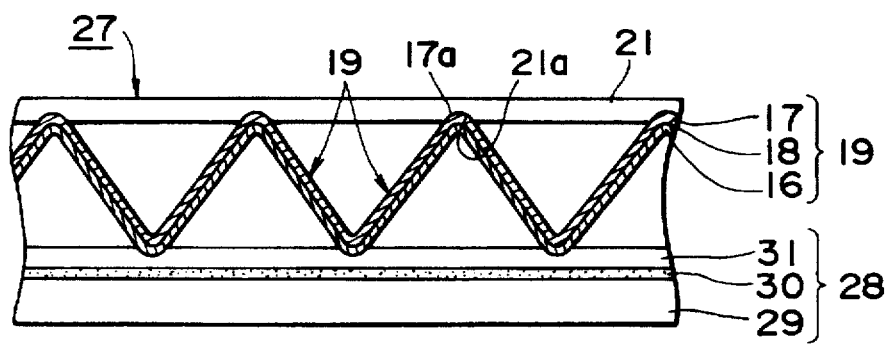

In addition, as shown in FIG. 8, it is freely applicable to employ the sandwiched vibration-damping plate 28 in which a thick-walled aluminum plate 29, a vibration-damping resin layer 30 and a thin-walled aluminum plate 31 are integrally formed in this order along a thickness direction as viewed from the sound source side (lower side as viewed in the drawing). With such a configuration as above, it is possible to cause a bending rigidity of the thick-walled aluminum plate 29 to approach to a bending rigidity of a truss type structure comprised of a thin-walled aluminum plate 31, the vibration-damping ribs 19 and an aluminum plate 21, and consequently it becomes possible to position the vibration-damping resin 30 near a neutral axis of the entire vibration-damping member 27 and to increase an absorbing strain energy. In addition, it is also possible that the upper side aluminum plate 21 is set such that resin is approached to the neutral axis in the same manner as that of the sandwiched vibration-damping plate 28. With such an arrangement as above, as compared with the arrangement in which the resin layer is positioned at a relatively long distance from the neutral axis of the entire member, a shearing strain energy generated in the resin when the vibration-damping member 27 receives the bending vibration is increased, and correspondingly, the vibration energy is converted into a heat energy, a rate of it discharged into the surrounding atmosphere is also increased, so that a sound shielding effect of the entire vibration-damping member can be increased much more.

Figure 9:
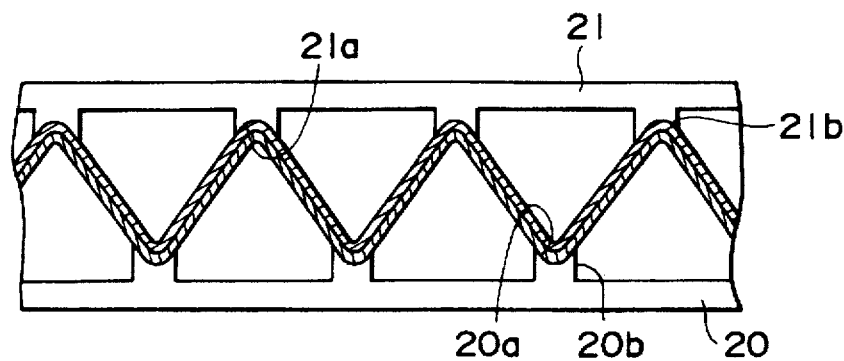

FIG. 9 shows a further improved example of the member shown in FIG. 6. The vibration-damping member shown in FIG. 9 is constructed such that the convex portions 20b, 21b in place of the longitudinal grooves 20a, 21a are furnished so as to prevent a partial reduction in rigidity of the aluminum plates 20, 21.

Figure 10:
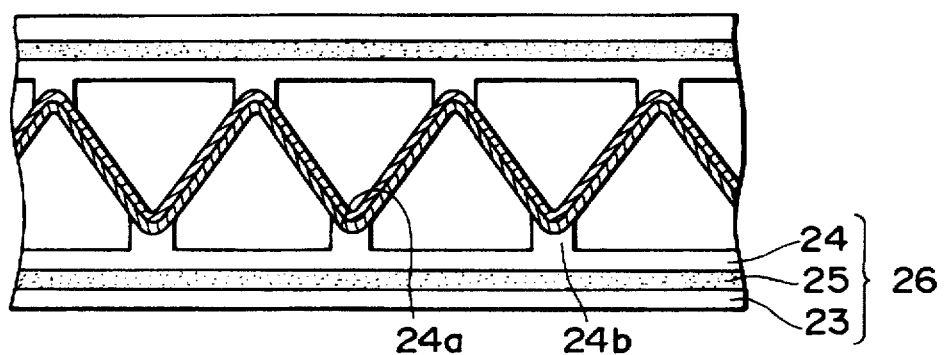

FIG. 10 shows a further improved example of the device shown in FIG. 7. The vibration-damping member shown in FIG. 10 is constructed such that the convex part 24b is furnished in place of longitudinal groove 24a so as to prevent a partial reduction in rigidity of the aluminum plate 24.

Figure 11:
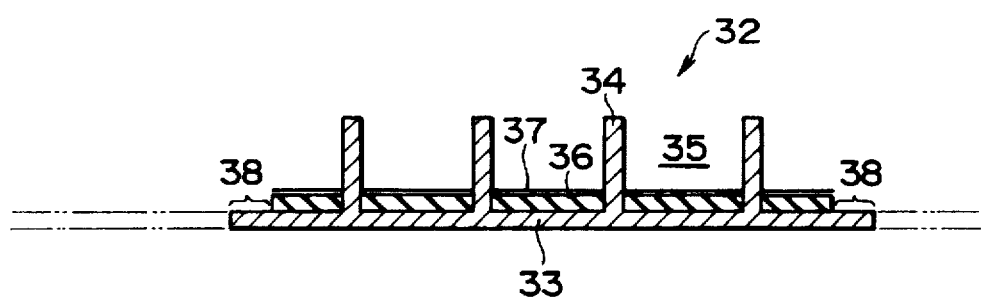
FIG. 11 is a sectional view for showing a vibration-damping solid profile of extruded shape.

A vibration-damping member 32 shown in FIG. 11 is comprised of an elongated face plate 33 extending from a front side of a sheet toward an opposite side and of four convex ribs 34 projected in a normal direction of one surface of the face plate 33, wherein a concave space 35 is formed by the convex ribs 34 and the face plate 33 to show a sectional shape. Then, the vibration-damping resin 36 and the thermoplastic resin film 37 are adhered to an upper one surface of the face plate 33 below the concave part 35. Such a vibration-damping member 32 has a solid profile of extruded shape, a plurality of vibration-damping members are connected at the right and left sides as viewed in the sheet so as to constitute a floor or side walls and a ceiling surface of a structural member. Since both ends of the face plate 33 become connected portions, the vibration-damping resin 36 is not adhered to the peripheral part 38 of the connected portion to avoid the troubles from welding and the like.

Figure 12:
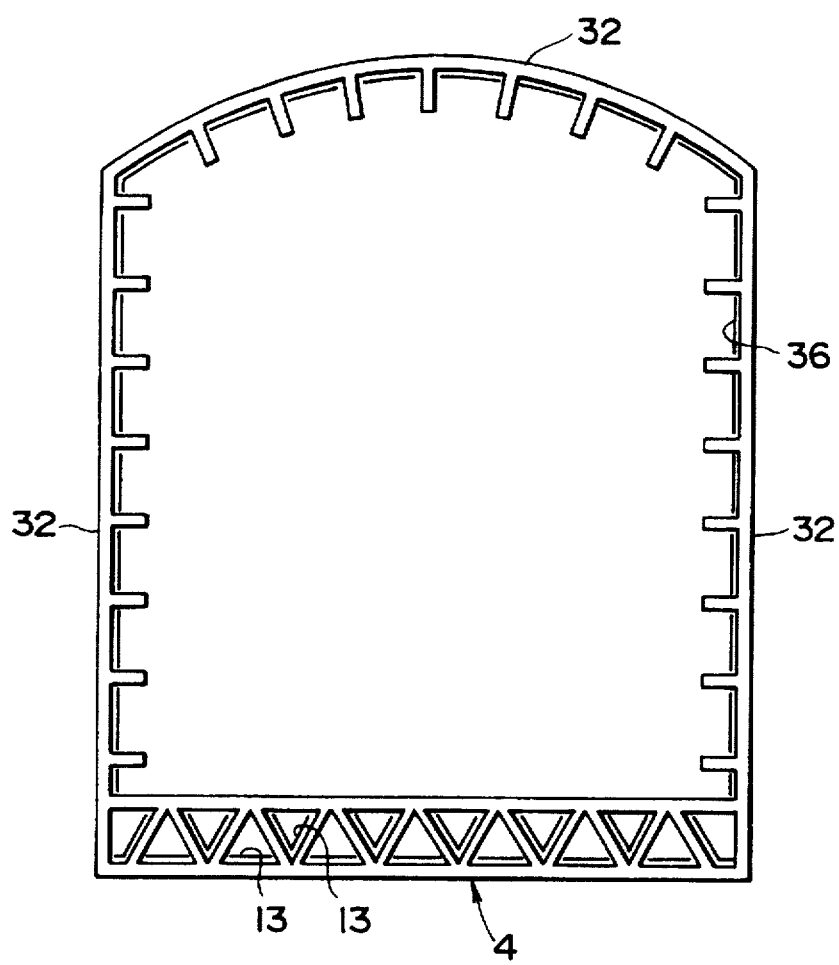
FIG. 12 is a sectional view for showing a structural member for a high-speed railway vehicle in which a truss type vibration-damping hollow profile and a vibration-damping solid profile are used.

Referring now to FIG. 12, one example of use of the aforesaid vibration-damping member will be described. FIG. 12 is a sectional view for showing a structure of a high-speed railway vehicle, in which the floor is fabricated by joining the truss type vibration-damping member 4 shown in FIG. 4 and the side walls and the ceiling are assembled by joining the solid type vibration-damping members 32 shown in FIG. 11. The vibration-damping member 4 absorbs vibration by bending deformation of the vibration-damping resin 13, where the vibration is induced by motor sound and a rolling sound excited at the lower surface of the floor. Then, the vibration induced by motor sound or rolling sound is prevented from being transmitted into the structural member for the carrier. In addition, application of the solid type vibration-damping member 32 at the ceiling or side wall prevents vibration sound of high frequency included in motor sound, rolling sound and airborne noise caused by high speed running from being transmitted into the structural member, with the vibration-damping resin 36 being deformed to absorb it. As a result, it is possible to provide a comfortable railway vehicle in which uncomfortable feeling caused by noise and vibration is not given during transportation of passengers. As such a structural member for a carrier, it may not be limited to the high-speed vehicle and it is also possible to use it in an airplane, an automobile and a ship and the like.

Figure 13:
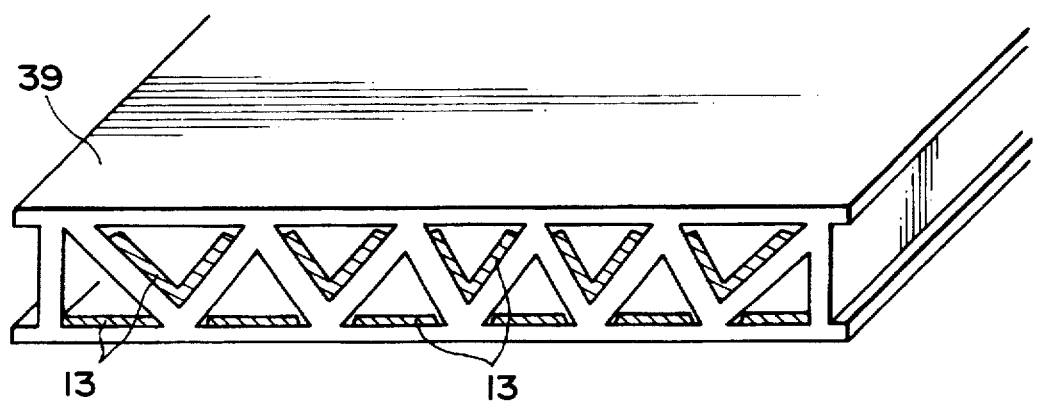
FIG. 13 is a perspective view for showing an extrusion hollow profile to which the vibration-damping resin is heat-bonded.

Then, a method for manufacturing a vibration-damping member which is a preferable example of such a vibration-damping structure will be described. As shown in FIG. 13, the vibration-damping resin is cut and formed in compliance with a size and a shape of a hollow space of the extrusion-formed member 39 so as to attain the vibration-damping resin sheet. Then, the vibration-damping resin sheet is inserted into the hollow space of extrusion-formed member 39 by pulling it and is mounted on the surface of the member to which the resin sheet is bonded. In the case that the surface of the member to be bonded is flat or a small slant surface, a mere mounting of the vibration-damping resin on the desired location enables heating, melting and bonding operations to be carried out and resulting in that the vibration-damping structural members can easily be obtained. On the other hand, in the case that the adhering surface is slant or a vertical plane, it is necessary to perform a temporary fixing until the vibration-damping material is heated, melted and bonded at the desired location. Although as the temporary fixing, some well-known methods such as adhesives or clip, fixing with small screws and double-adhering surface tape or the like can be used. But, in the case where the vibration-damping resin contains blowing agent, a temporary fixing method for prohibiting the foaming should be avoided.

Means for heating may be of the prior well-known method and an electrical heating furnace, a gas heating furnace and other heating means may also be used. In particular, it is not necessary to have an exclusive heating. Utilization of heat for heating and drying of enamel type coating with thermosetting resin or utilization of heat for annealing for a shaped member, for example, may also be applied.

It is necessary that a heating temperature of the vibration-damping resin is about 100° to 250° C. That is, if the heating temperature is 100° C. or lower, foaming, melting and bonding of the vibration-damping resin become insufficient and in turn if the heating temperature exceeds 250° C., the vibration-damping resin is oxidized to cause its material quality to be fragile. It is preferable that the heating time is about 30 minutes to 2 hours. In addition, in the case that the vibration-damping resin containing positively blowing agent about claim 3 is used, the vibration-damping resin is foamed by about 3 to 7 times through heating to enable the vibration-damping resin to be bonded under no irregular thickness but with a uniform thickness regardless of uneven state of the surfaces to be bonded.

Then, the vibration-damping performance both of the vibration-damping resin and of the vibration-damping structure to which the vibration-damping resin is adhered along with various features described above will be further described as follows.

At first, the vibration-damping resin to be tested was prepared as indicated in Table 1 such that blown asphalt of 32 wt % was heated and melted, stylene butadiene rubber acting as synthetic rubber of 10 wt % and petroleum resin of 5 wt % were fed to the asphalt and in addition, calcium carbonate of 40 wt %, crushed used paper of 8 wt % and lime stone of 5 wt % acting as filler material were added, mixed and dispersed by a vacuum kneader. The mixed material is next formed into a sheet having a thickness of about 2 mm, mounted on an aluminum alloy plate used for a railway vehicle and heated at 170° C. for 40 minutes, thereby the vibration-damping structure having the vibration-damping resin completely heated and bonded to the aluminum alloy plate was prepared (embodiment 1).

Then, the vibration-damping resin was formed into a sheet and taken up into a roll with a width of 10 cm and a length of 100m. Then, the vibration-damping resin sheet pulled out of the roll end was pushed into the hollow portion in the extruded member 39 having a length of about 25 m and a width of about 50 cm shown in FIG. 13, pulled by a guide rod installed from an opposite side, resulting in that the resin could be inserted and mounted quite well without producing any breakage or the like and it was confirmed that its workability was superior.

As another vibration-damping resin, under the aforesaid configuration, silica type light weight aggregate of 10 wt %, calcium carbonate of 30 wt %, crushed used paper of 8 wt % and lime stone of 5 wt % acting as filler material were added, they were formed into a sheet having the same shape as one described above, mounted on an aluminum alloy plate for a railway vehicle structure, heated at 170° C. for 40 minutes, thereby a vibration-damping structure having the vibration-damping resin completely heated, melted and bonded to the aluminum alloy plate was prepared (preferred embodiment 2). Also in this configuration, it was confirmed that the resin could be smoothly inserted into the hollow portion, mounted there and its workability was superior.

In addition, a polyethylene resin film having a thickness of 50 µm was laminated and adhered to one surface of the vibration-damping resin sheet containing silica type light weight aggregate acting as a filler material, mounted on an aluminum alloy plate used for a railway vehicle structure, heated at 170° C. for 40 minutes and a vibration-damping structure having the vibration-damping resin completely heated and bonded to the aluminum alloy plate was prepared (embodiment 3).

In addition, hot melt adhesive agent composed of ethylene vinyl acetate having a thickness of 30 µm was laminated as a second layer and adhered to one surface of the vibration-damping resin sheet containing silica type light weight aggregate acting as filler material. This was mounted on the aluminum alloy plate used for a railway vehicle structure, heated at 170° C. for 40 minutes, thereby a vibration-damping structure having vibration-damping resin completely heated, melted and bonded to the aluminum alloy plate was also prepared (embodiment 4).

In addition, hot melt adhesive agent composed of ethylene vinyl acetate having a thickness of 30 µm was laminated as a second layer and adhered to one surface of the vibration-damping resin sheet containing silica type light weight aggregate acting as filler material and a polyethylene resin film having a thickness of 50 µm was laminated and adhered as a third layer. This was mounted on the aluminum alloy plate used for a railway vehicle structure, heated at 170° C. for 40 minutes, thereby a vibration-damping structure having vibration-damping resin completely heated, melted and bonded to the aluminum alloy plate was also prepared (embodiment 5).

In addition, in order to evaluate various features of the aforesaid embodiments 1 to 5, compounds having blending rates indicated in the comparison examples of 1 to 9 of Table 1 were kneaded and dispersed by a vacuum kneader, thereafter they were formed into a sheet having a thickness of about 2 mm, then mounted on the aluminum alloy plate used for a railway vehicle structure, heated at 170° C. for 40 minutes, thereby a vibration-damping structure having vibration-damping resin completely heated, melted and bonded to the aluminum alloy plate was prepared.

Then, an evaluation test in regard to a thermal insulation and a vibration-damping was carried out for the vibration-damping members (embodiments of 1 to 5 and comparison examples of 1 to 9). Measurements on flexibility, shock resistance at low temperatures, specific weight and tensile strength were also carried out and the results of these measurements were indicated in Table 2.

Each of the measuring methods was as follows.

Figure 14:
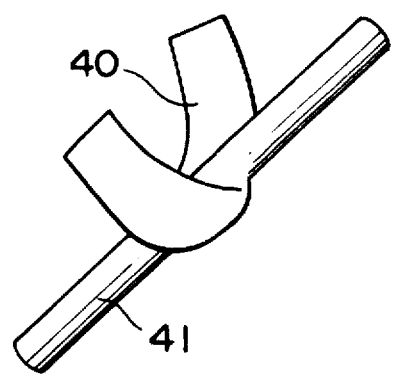
FIG. 14 is an illustrative view for showing a method for measuring flexibility of resin sheet.
Figure 15:
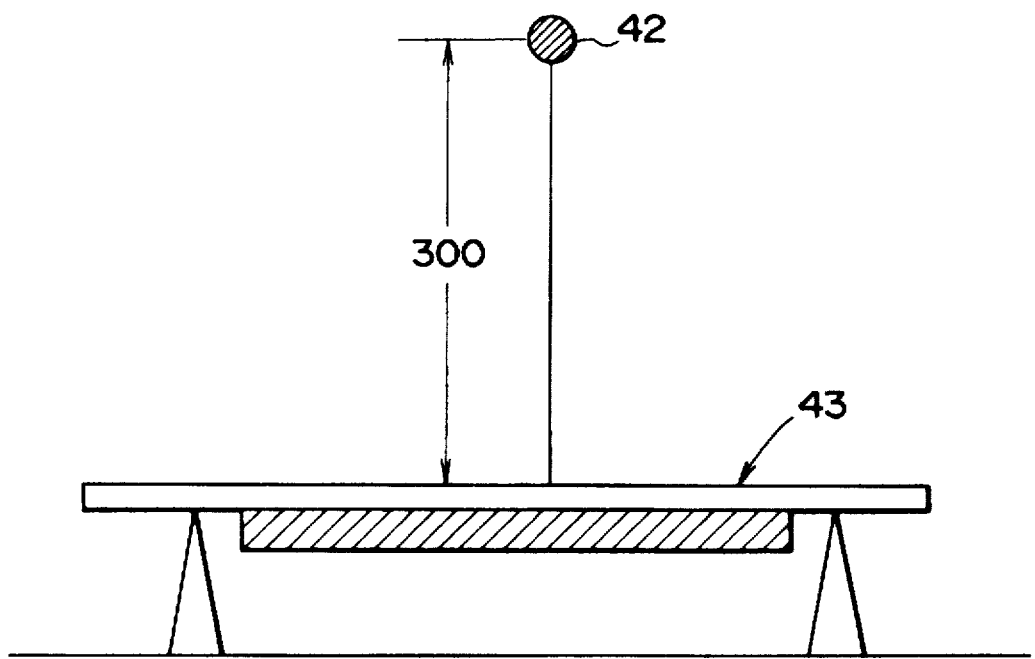
FIG. 15 is an illustrative view for showing a method for measuring a shock resistance at low temperature.

At first, as to the thermal insulating characteristic, a thermal insulating test was performed in compliance with JIS R1611 (a laser-flashing method) and a heat conductivity (W/m.K) was measured. As to the vibration-damping characteristic, loss factor $\mu$ at each of the temperatures of 20° C., 40° C., 60° C. was measured by a resonance method. The higher the loss factor $\mu$, the higher the effect of vibration-damping and it is well known that a value of 0.05 or more is sufficient for obtaining the effect of vibration-damping. In addition, in order to evaluate the flexibility influencing on productivity or handling ability when the material is formed into a sheet or it is inserted into shaped members, the vibration-damping resin (50×200 mm) was put in a thermo-hygrostat, left at a desired temperature for 2 hours or more, thereafter as shown in FIG. 14, the resin was wound at a steel rod 41 with a diameter of 10 mm just after taking out of the thermo-hygrostat and a broken surface of the vibration-damping resin 40 was observed with eyes. Then, a case in which the resin was not broken at a range of −20° to 40° C.

or no other abnormal state occurred was evaluated as "502"; a case in which the resin was not broken at a range of 0° to 30° C. and no other abnormal state occurred was evaluated as "○"; and a case in which the resin was not broken at a range of 5 to 25° C. and no other abnormal state occurred was evaluated as "Δ". In order to evaluate the shock resistance at low temperatures, the vibration-damping resin (100×50×3 mm) was heated, melted and bonded to the aluminum plate (150×200×2 mm) to provide a test piece. The piece was put into the thermo-hygrostat, left at a desired temperature for 2 hours or more, and just after the piece was taken out of the thermo-hygrostat, a test was carried out such that a steel ball 42 was free dropped from 300 mm above the test piece, as shown in FIG. 15. A degree of peeling between the vibration-damping resin and the aluminum base plate in the test piece 43 was visually observed. A case in which no peeling occurred until -20° C. was evaluated as "502"; a case in which no peeling occurred until 0° C. was evaluated as "○"; and a case in which no peeling occurred until 10° C. was evaluated as "Δ". In addition, a specific weight of the resin was measured by a water substitution method.

In the embodiments 1 and 2, a specific weight of the vibration-damping resin in the embodiment 1 is 1.6 and one in the embodiment 2 is 1.5, so that if silica type light weight aggregate is used as filler material, the specific weight can be reduced while various performances are being kept. In addition, in the embodiments 2 and 3, shock resistance at low temperatures of the vibration-damping resin in the embodiment 2 was "○", one in the embodiment 3 was "502" and moreover the loss factor in the embodiment 3 is greater than that in the embodiment 2. As a result, it became apparent that lamination and adhering of the polyethylene resin film enabled the shock resistance and vibration-damping characteristic to be further improved. In addition, in the embodiment 4, since the loss factor and shock resistance were also superior, it became apparent that lamination and adhering of the hot melt film on the vibration-damping resin enabled those characteristics to be improved. In the embodiment 4, it was confirmed that flexibility, shock resistance at low temperatures and a vibration-damping characteristic can be improved even only with hot melt film. Also in the embodiment 5 in which hot melt film and polyethylene resin film were laminated and adhered, it was confirmed that a similar effect could be attained.

In turn, the vibration-damping resin composed of asphalt, filler materials and blowing agents was manufactured and its various features were evaluated. That is, mixtures having blendings shown in Table 3 were mixed and dispersed with a vacuum kneader, and then blowing agent was fed, mixed and dispersed at the time when the temperature of the mixtures was decreased to 80° C. This mixture dispersion material was formed by a calendar roll into a sheet form having a thickness of about 2 mm to make seven kinds of vibration-damping resin sheets, thereafter the sheet was mounted on the structured aluminum alloy plate used for a railway vehicle, heated at 170° C. for 40 minutes, the vibration-damping resin was foamed at a foaming rate of between 3 to 7 times and in consequence a vibration-damping structure having the resin completely, bonded to the aluminum alloy plate was attained.

In addition, in Table 3, the embodiments 1 to 5 are examples in which the substances of the resin are within the range of the present invention and a rate of foaming is within 3 to 7 times. The comparison examples 1 and 2 as shown in Table 3 are prepared for evaluating various features of the aforesaid embodiments 1 to 5 and these amount of blending are out of the present invention. As for the vibration-damping member obtained in this way, a heat-insulating characteristic, a vibration-damping characteristic and a tensile strength were measured and evaluated in the same manner as that for the vibration-damping resin aforesaid having no blowing agent. Its result is indicated in Table 4.

Each of the measuring methods was as follows.

As for the heat insulating characteristic, a heat-insulating test was carried out in compliance with JIS A1412. The heat conductivity (W/m.K) was measured. As for the vibration-damping characteristic, the loss factor p at each of the temperatures 20° C., 40° C., 60° C. was measured by a resonance method. As for the tensile strength, the vibration-damping structure was compressed and measured by a strograph testing machine. Young's modulus was calculated in reference to the ratio of the stress to the strain and applied as an evaluation for the tensile strength. As for the foaming multiplication rate, it indicates a foaming multiplication in the direction of thickness.

As indicated in the aforesaid Table 4, the vibration-damping structures in the embodiments has all superior performances such as heat insulating characteristic, vibration-damping characteristic and tensile strength. In turn, the comparison example 1 has a high heat conductivity and therefore a poor heat insulating characteristic and concurrently it has a poor vibration-damping at a temperature range exceeding 40° C., and the comparison example 2 is inferior in the tensile strength. A reason for it might be consisted in the fact that the foaming multiplication is insufficient or too high due to improper amount of blowing agent.

TABLE 1

|  | Blown Asphalt | Synthetic Rubber | Petroleum Resin | Silica Light Weight Aggregate | Calcium Carbonate | Used Paper | Quick Lime |
|---|---|---|---|---|---|---|---|
|  |  |  |  |  |  |  | (Weight %) |
| Embodiment 1 | 32 | 10 | 5 |  | 40 | 8 | 5 |
| Embodiment 2 | 32 | 10 | 5 | 10 | 30 | 8 | 5 |
| Embodiment 3 | 32 | 10 | 5 | 10 | 30 | 8 | 5 |
| Embodiment 4 | 32 | 10 | 5 | 10 | 30 | 8 | 5 |
| Embodiment 5 | 32 | 10 | 5 | 10 | 30 | 8 | 5 |
| Comparison Example 1 | 47 |  |  |  | 40 | 8 | 5 |
| Comparison Example 2 | 14 | 10 | 5 |  | 58 | 8 | 5 |
| Comparison Example 3 | 36 | 10 | 5 |  | 36 | 8 | 5 |

TABLE 1-continued

|  | Blown Asphalt | Synthetic Rubber | Petroleum Resin | Silica Light Weight Aggregate | Calcium Carbonate | Used Paper | (Weight %) Quick Lime |
|---|---|---|---|---|---|---|---|
| Comparison Example 4 | 32 | 1 | 5 |  | 49 | 8 | 5 |
| Comparison Example 5 | 32 | 16 | 5 |  | 34 | 8 | 5 |
| Comparison Example 6 | 32 | 10 |  |  | 45 | 8 | 5 |
| Comparison Example 7 | 32 | 10 | 6 |  | 39 | 8 | 5 |
| Comparison Example 8 | 34 | 12 | 5 |  | 36 | 8 | 5 |
| Comparison Example 9 | 19 | 4 | 1 |  | 63 | 8 | 5 |

TABLE 2

|  | Flex-ibility | Tensile Strength (N) | Heat Conductivity (W/m · K) | Specific Weight | Shock Resistance | Loss factor ($\mu$) 20° | 40° | 60° | Remarks |
|---|---|---|---|---|---|---|---|---|---|
| Embodiment 1 | ⊙ | 15 | 0.43 | 1.6 | ○ | 0.14 | 0.11 | 0.08 |  |
| Embodiment 2 | ⊙ | 15 | 0.42 | 1.5 | ○ | 0.15 | 0.12 | 0.09 |  |
| Embodiment 3 | ⊙ | 15 | 0.42 | 1.5 | ⊙ | 0.18 | 0.14 | 0.11 | PE film |
| Embodiment 4 | ⊙ | 15 | 0.42 | 1.5 | ⊙ | 0.15 | 0.14 | 0.11 | Hot melt |
| Embodiment 5 | ⊙ | 15 | 0.42 | 1.5 | ⊙ | 0.19 | 0.15 | 0.12 | Hot melt PE film |
| Comparison Example 1 | ⊙ | 4 | 0.48 | 1.5 | Δ | 0.12 | 0.09 | 0.06 |  |
| Comparison Example 2 | Δ | 15 | 0.48 | 1.5 | Δ | 0.10 | 0.08 | 0.06 | Small amount of asphalt |
| Comparison Example 3 | ⊙ | 5 | 0.48 | 1.5 | Δ | 0.12 | 0.10 | 0.08 | Large amount of asphalt |
| Comparison Example 4 | ○ | 7 | 0.48 | 1.5 | Δ | 0.10 | 0.08 | 0.06 | Small amount of asphalt |
| Comparison Example 5 | ○ | 10 | 0.48 | 1.5 | Δ | 0.08 | 0.06 | 0.04 | Large amount of asphalt |
| Comparison Example 6 | Δ | 7 | 0.48 | 1.5 | Δ | 0.10 | 0.08 | 0.06 | None Petroleum Resin |
| Comparison Example 7 | Δ | 18 | 0.43 | 1.5 | Δ | 0.10 | 0.08 | 0.06 | Large amount of petroleum |
| Comparison Example 8 | Δ | 6 | 0.42 | 1.5 | ○ | 0.07 | 0.05 | 0.03 | Small amount of filling material |
| Comparison Example 9 | Δ | 6 | 0.50 | 1.9 | Δ | 0.08 | 0.06 | 0.04 | Large amount of filling material |

TABLE 3

| Compounding Substances | Embodiment 1 | 2 | 3 | 4 | 5 | Comparison Example 1 | 2 | (Weight part) |
|---|---|---|---|---|---|---|---|---|
| Straight asphalt | 100 | 100 | 100 | 70 | 70 | 100 | 100 | |
| 1,2-Polybutadiene elastomer | — | — | — | 40 | 40 | — | — | |
| Calcium carbonate | 300 | 300 | 300 | 300 | 300 | 300 | 300 | |
| Sulfur | — | — | — | 8 | 8 | — | 8 | |
| P-P' Oxibenzole | 0.8 | 1.0 | 1.2 | — | — | 0.4 | — | |
| Azobisisotilnitril | — | — | — | 4 | 5 | — | 6 | |

TABLE 4

|  |  | Young's Modulus (N/m²) | Foaming Multiplication Factor | Heat Conductivity (W/m·K) | Loss factor (μ) 20° C. | Loss factor (μ) 40° C. | Loss factor (μ) 60° C. |
| --- | --- | --- | --- | --- | --- | --- | --- |
| Embodiment | 1 | 6 × 10⁵ | 3.0 | 0.10 | 0.30 | 0.45 | 0.35 |
|  | 2 | 5 × 10⁵ | 4.0 | 0.08 | 0.33 | 0.50 | 0.37 |
|  | 3 | 3 × 10⁵ | 5.0 | 0.07 | 0.37 | 0.52 | 0.42 |
|  | 4 | 2 × 10⁵ | 6.0 | 0.06 | 0.38 | 0.53 | 0.45 |
|  | 5 | 8 × 10⁴ | 7.0 | 0.03 | 0.40 | 0.55 | 0.50 |
| Comparison Example | 1 | 7 × 10⁷ | 1.5 | 0.20 | 0.35 | 0.30 | 0.18 |
|  | 2 | 4 × 10⁴ | 8.0 | 0.01 | 0.40 | 0.50 | 0.50 |

What is claimed is:

1. A vibration-damping structure comprised of a metallic plate and a vibration-damping resin layer integrally melted and bonded to said metallic plate, wherein it is comprised of vibration-damping resin material which contains a homogeneous blend of asphalt of 15 to 35 wt %, synthetic rubber of 2 to 10 wt %, petroleum resin of 1 to 5 wt % and filler material of 50 to 75 wt %, and said filler material including inorganic light weight aggregate of 10 to 25 wt %, powder-like filler material of 35 to 50 wt %, fibrous filler material of 3 to 8 wt % and limestone of 2 to 5 wt %.

2. A vibration-damping structure according to claim 1 in which one layer or more made of thermoplastic resin are arranged between said vibration-damping resin layer and the metallic plate.

3. A vibration-damping structure comprised of a metallic plate and a vibration-damping resin layer integrally melted and bonded to said metallic plate, wherein said vibration-damping resin layer is comprised of vibration-damping resin which contains a homogeneous blend asphalt of 70 to 150 weight part, filler material of 15 to 300 weight part, and blowing agent of 0.5 to 10 weight part.

4. A vibration-damping structure according to claim 3 in which one layer or more made of thermoplastic resin are arranged between said vibration-damping resin layer and the metallic plate.

5. A vibration-damping structure according to claim 1, wherein said vibration-damping resin layer is integrally melted and bonded on the inner surface of an Al extruded shape having a hollow portion.

6. A vibration-damping structure according to claim 2, wherein said vibration-damping resin layer is integrally melted and bonded on the inner surface of an Al extruded shape having a hollow portion.

7. A vibration-damping structure according to claim 3, wherein said vibration damping resin layer is integrally melted and bonded on the inner surface of an Al extruded shape having a hollow portion.

8. A vibration-damping structure according to claim 4, wherein said vibration-damping resin layer is integrally melted and bonded on the inner surface of an Al extruded shape having a hollow portion.

* * * * *